1,869,013

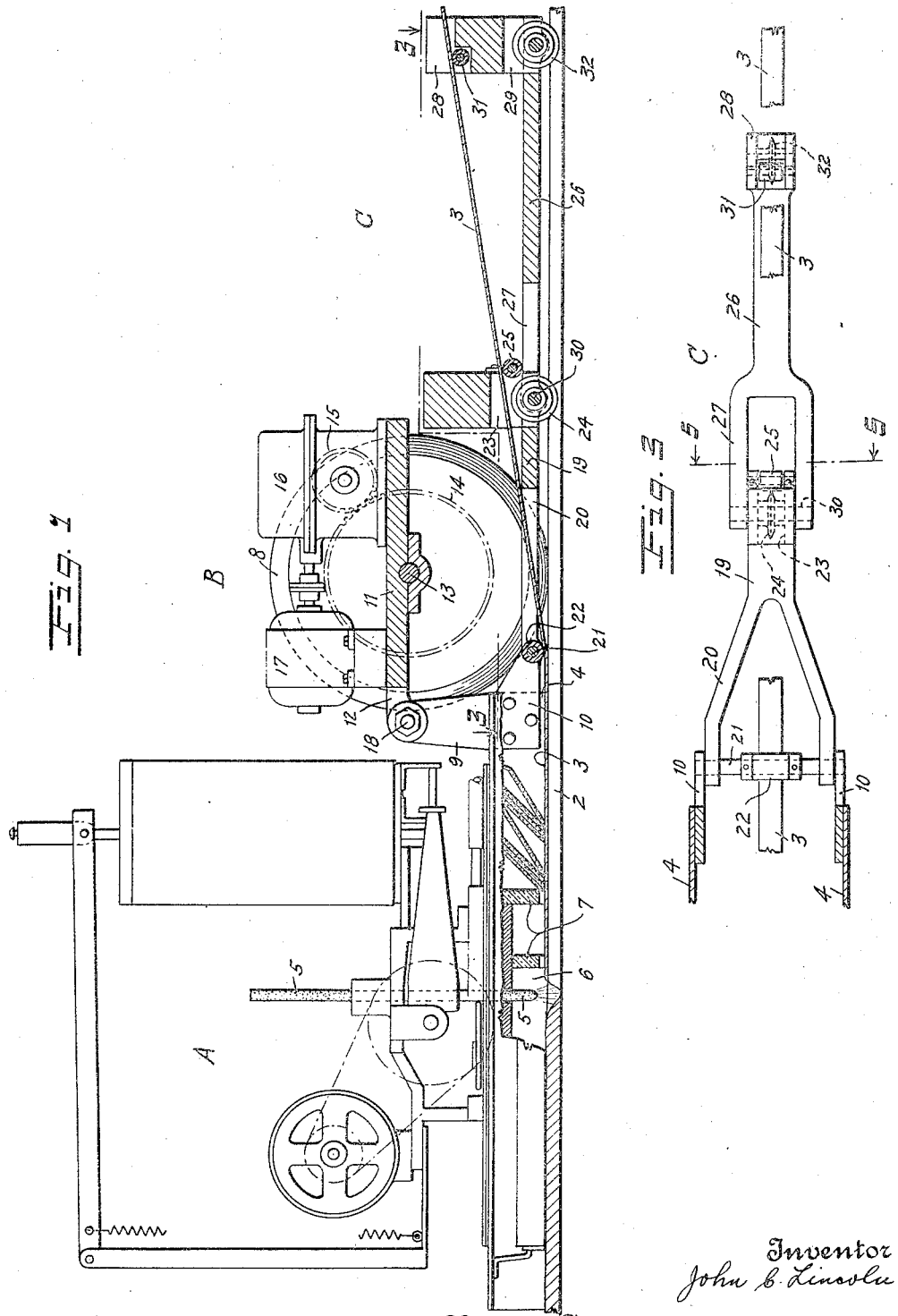
July 26, 1932.  J. C. LINCOLN  1,869,013
WELDING APPARATUS
Filed Feb. 25, 1928   2 Sheets-Sheet 1
Inventor
John C. Lincoln
By his Attorney
Albert H. Austin July 26, 1932. J. C. LINCOLN 1,869,013
WELDING APPARATUS
Filed Feb. 25, 1928 2 Sheets-Sheet 2
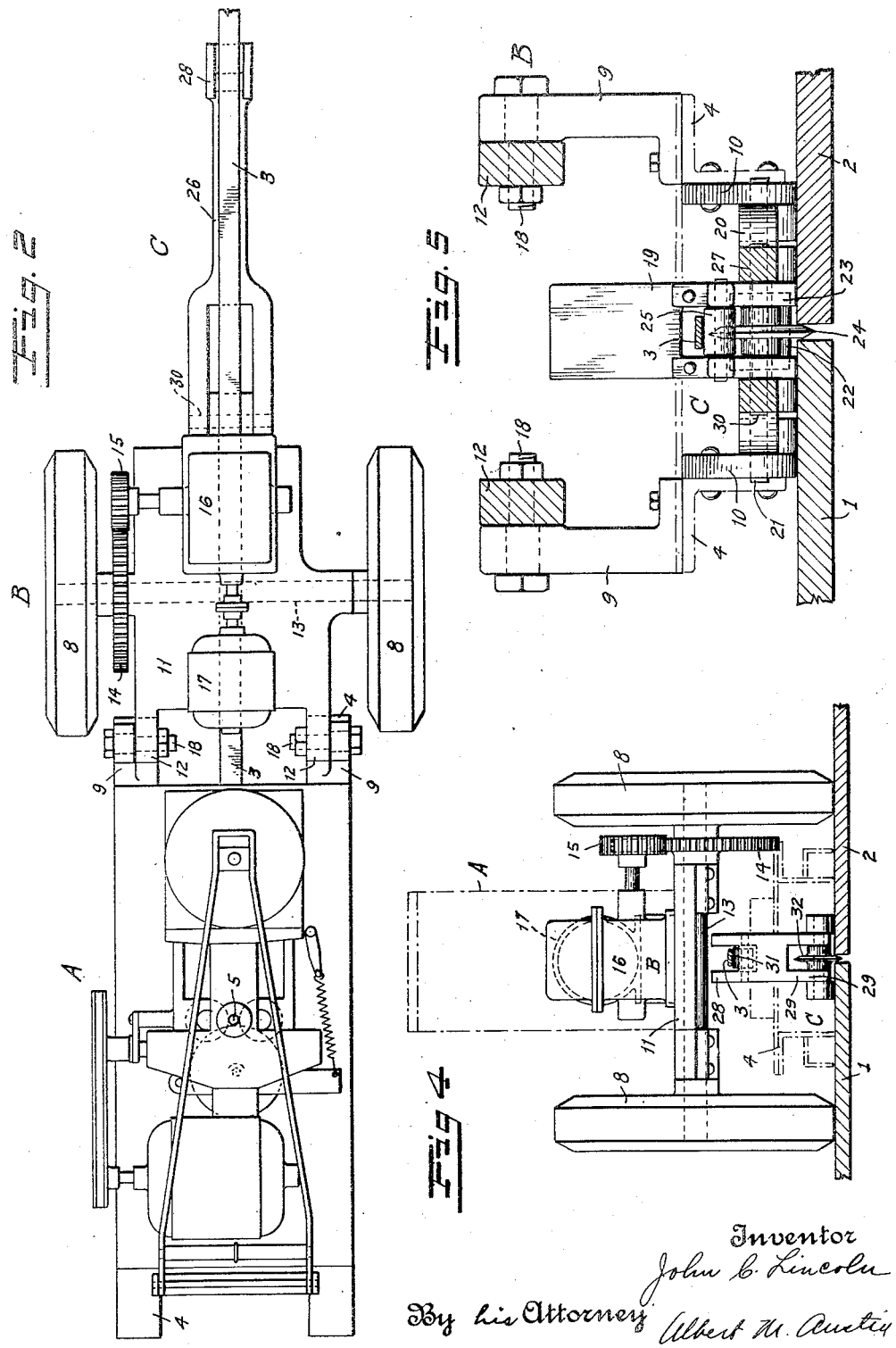
Inventor
John C. Lincoln
By his Attorney
Albert M. Austin Patented July 26, 1932

UNITED STATES PATENT OFFICE

JOHN C. LINCOLN, OF CLEVELAND, OHIO, ASSIGNOR TO THE LINCOLN ELECTRIC COMPANY, OF CLEVELAND, OHIO, A CORPORATION OF OHIO

WELDING APPARATUS

Application filed February 25, 1928. Serial No. 256,841.

The invention relates in general to the art of welding, and more particularly to devices for drawing and guiding a welding unit along the seam to be welded.

According to the invention, a welding unit is provided with a tractor for drawing it along the work, and a pilot truck for guiding the unit and tractor along the seam to be welded. The unit may comprise a housing fitting closely over the work to exclude the air therefrom and an electrode disposed therein for drawing the welding arc. The tractor may comprise a frame having suitable drive wheels and a drive motor. The guide truck may include pivotally connected links having suitable guide wheels fitting in the seam to guide the unit therealong. Suitable supporting rollers may be provided on the unit and guide truck for supporting and guiding a welding strip for the purpose of improving the character of the weld.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is an elevation partly in section of the apparatus according to the invention;

Fig. 2 is a plan view thereof;

Fig. 3 is a detail plan partly in section of the guide truck;

Fig. 4 is a front end view of the apparatus; and,

Fig. 5 is a detail section taken on the line 5—5 of Fig. 3.

In the drawings accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

In the following description and in the claims parts will be identified by specific names for convenience, but they are intended to be as generic in their application to similar parts as the art will permit.

Like reference characters denote like parts in the several figures of the drawings.

Referring now to the drawings, the work to be welded comprises a pair of plates 1 and 2 in close relationship having a seam therebetween which is to be welded by the welding apparatus. If desired, a welding strip 3 comprising a layer of filling metal which may be the same metal as the work and an underlayer of flux may be provided to improve the character of the weld. The filling metal is for the purpose of increasing the cross section of the weld, and the flux which may be water glass, borax or any other salt having water of crystallization is for the purpose of creating a suitable welding atmosphere within the housing surrounding the arc.

The welding apparatus comprises a welding unit denoted generally by A, a tractor denoted generally by B and a pilot truck denoted generally by C. The unit A comprises a suitable framework having a carbon electrode 5 between which and the work the welding arc is drawn. Surrounding the electrode is a suitable housing 6 made up of suitable air excluding and fire resisting members 7 to effectively exclude air from the arc. The framework includes longitudinal members 4 having secured thereto a pair of upstanding posts 9 and a pair of brackets 10. It will be understood that the present invention may be used also with other kinds and forms of welding unit.

The tractor B comprises a frame plate 11 having a pair of ears 12 and an axle 13 on which is mounted traction wheels 8 having tires of rubber or other soft material to obtain maximum traction with the work. The axle 13 is provided with a spur gear 14 meshing with a driving pinion 15 which in turn is driven by suitable reduction gearing 16. A motor 17 is mounted on the tractor for driving the drive wheels 8 through the reduction gearing. Suitable pins 18 are provided passing through the ears 12 and posts 9 to hingedly connect the tractor to the unit.

The pilot truck C comprises a rear link 19 having rear forks 20. A pin 21 passes through the brackets 10 and the rear forks 20 to hingedly connect the rear link with the unit and a guide roller 22 is mounted on the pin for holding the welding strip 3 against the work. The front end of the rear link is provided with spaced front walls 23 between which is positioned a guide wheel 24. A guide roller 25 is journalled between the walls 23 to guide the welding strip.

The front link 26 of the truck has a pair of rear forks 27 and front spaced upper walls 28 and spaced lower walls 29. A pin 30 passes through the walls 23 of rear link 19, guide wheel 24 and forks 27. A guide roller 31 for guiding the welding strip is journalled in between the upper walls 28 and a guide wheel 32 is journalled between the lower walls 29. The front and rear guide wheels 24 and 32 are provided with sharp edges to aid in fitting between the plates 1 and 2 to be welded to effectively guide the tractor and unit along the seam.

A suitable speed controlling device such as a rheostat may be provided preferably on the tractor for controlling the speed of the tractor motor 17 to control the speed of the unit in accordance with the depth it is desired for the weld to penetrate. If it is desired that the weld penetrate entirely through the sheets to be welded, the speed of travel of the unit must be slower than if it is only desired that the weld penetrate but a fraction of the thickness of the plates.

It will be seen that the present device automatically draws and guides the welding unit along the seam to be welded so that, with but small care on the part of the operator, it is assured that both plates will be evenly and thoroughly heated so that the seam will be uniformly welded. Furthermore, the present apparatus assists in making a weld of uniform depth, since, when the desired speed is once established, the depth of the weld should be constant for that speed. Furthermore, the welding strip is effectively guided by the pilot truck so that at all times the strip is automatically held in proper relation to the seam and to the welding arc.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. Articulated welding apparatus comprising a welding unit and a pilot truck for guiding said unit along a seam to be welded, said truck comprising a plurality of links pivoted together and to said unit, said links having elements fitting into said seam.

2. In welding apparatus, a welding unit adapted to be dragged over the work along a seam to be welded and comprising a housing resting on said work having an electrode therein, a tractor comprising a body, drive wheels supporting said body and a drive motor for driving said wheels, a hinge device connecting said body and unit, a pilot truck comprising a rear link pivotally connected to said unit, a rear guide wheel journalled at the front end of said rear link, a front link pivoted to said rear link, a front guide wheel journalled at the front end of said front link, guide rollers on said truck and unit for guiding a welding strip, said guide wheels fitting in said seam.

3. In welding apparatus, a welding unit adapted to be dragged over the work along a seam to be welded and comprising a housing resting on said work having an electrode therein, said unit having a pair of upstanding posts and a pair of depending brackets, a tractor comprising a body, drive wheels supporting said body and a drive motor for driving said wheels, a pintle connecting said body and posts, a pilot truck comprising a rear link having rear forks, a pin passing through said forks and said brackets, a guide roller on said pin, said rear link having front walls, a rear guide wheel between said walls, a guide roller journalled between said walls above said wheel, a front link having second rear forks, an intermediate pin passing through said second rear forks, said rear guide wheel and said walls, said front link having front lower spaced walls and upper spaced walls, a front guide wheel between said lower walls, a pin passing through said lower walls and said front wheel, a front roller journalled between said upper walls, said guide rollers guiding a welding strip, said guide wheels fitting in said seam.

4. In portable welding apparatus, a welding unit comprising an electrode for drawing an arc with the seam to be welded and for movement along said seam and means movable with said unit for holding said electrode and also a welding strip in proper relation to the seam as the unit moves along the seam.

5. In portable welding apparatus, a welding unit comprising a welding electrode for positioning over the work to be welded, a separate tractor having a source of power thereon for dragging the welding unit over the work, and means for articularly connecting said unit and tractor together.

6. In portable welding apparatus, a welding unit comprising a welding electrode for positioning over the seam to be welded, a separate guiding device cooperating with said seam to guide said unit along the seam, and means for articularly connecting said unit and device together.

7. In portable welding apparatus, a welding unit comprising a welding electrode for positioning over the seam to be welded, a separate tractor having a source of power thereon for dragging the welding unit along the seam, a separate guiding truck cooperating with said seam to guide said tractor and unit along the seam, and means for articularly connecting said unit and tractor together.

8. In portable welding apparatus, a welding unit comprising an air-excluding housing for positioning over the work to be welded, an electrode within said housing for drawing an arc with said work, a separate tractor having a source of power thereon for dragging the welding unit over the work, and means for articularly connecting said unit and tractor together.

9. In portable welding apparatus, a welding unit comprising an air-excluding housing for positioning over a seam to be welded, an electrode within said housing for drawing an arc with said seam, a separate guiding device fitting in said seam to guide said unit along the seam, and means for articularly connecting said device and unit together.

10. In portable welding apparatus, a welding unit comprising an air-excluding housing for positioning over the seam to be welded and resting upon the work, an electrode within said housing for drawing an arc with said seam, a separate tractor having a source of power thereon for dragging the welding unit over the work, a separate guiding truck fitting in said seam to guide said tractor and unit along the seam, and means for articularly connecting said tractor, truck and unit together.

In testimony whereof I have hereunto set my hand.

JOHN C. LINCOLN.